UNITED STATES PATENT OFFICE.

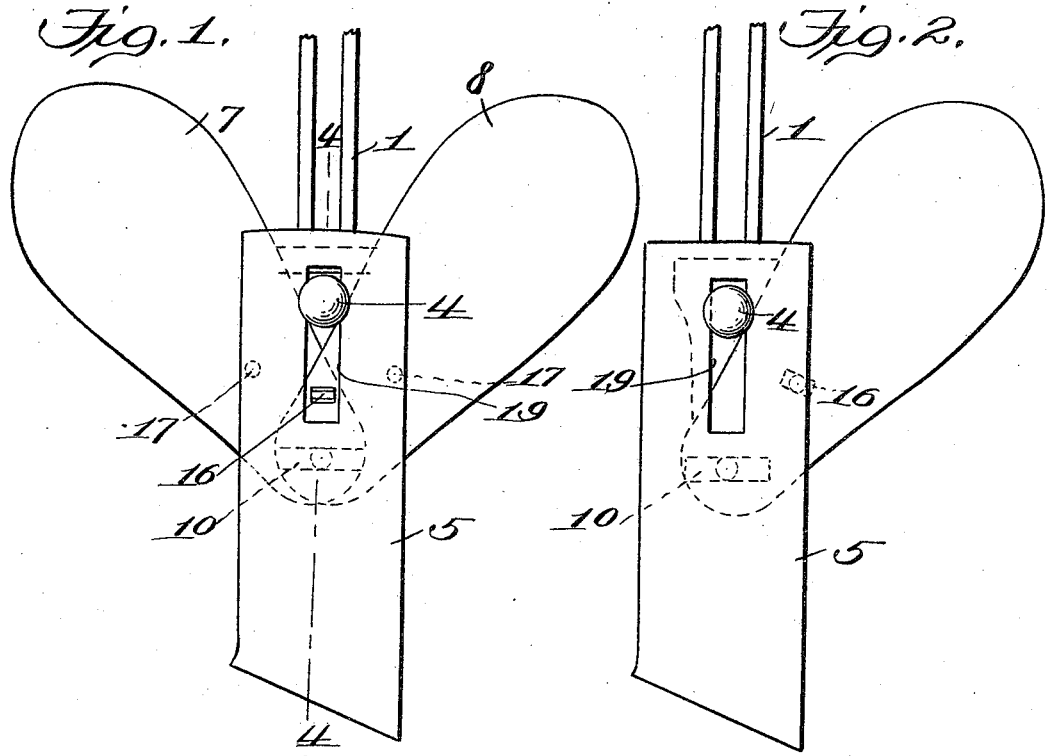
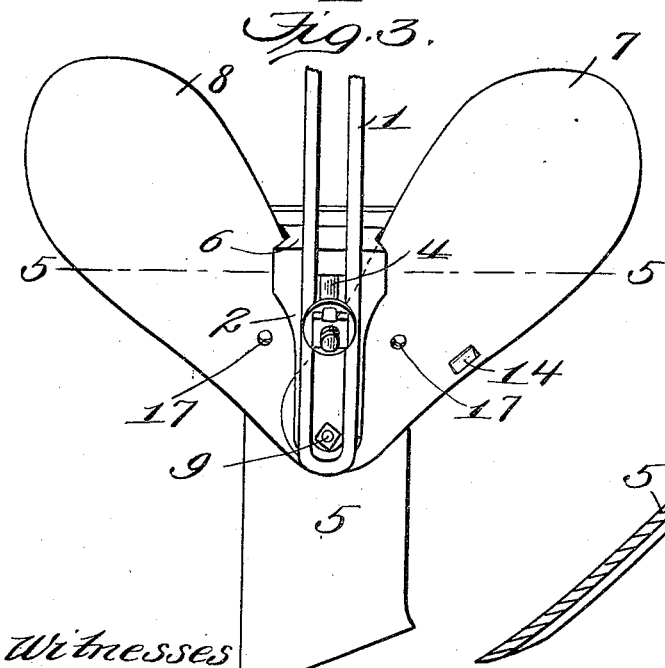
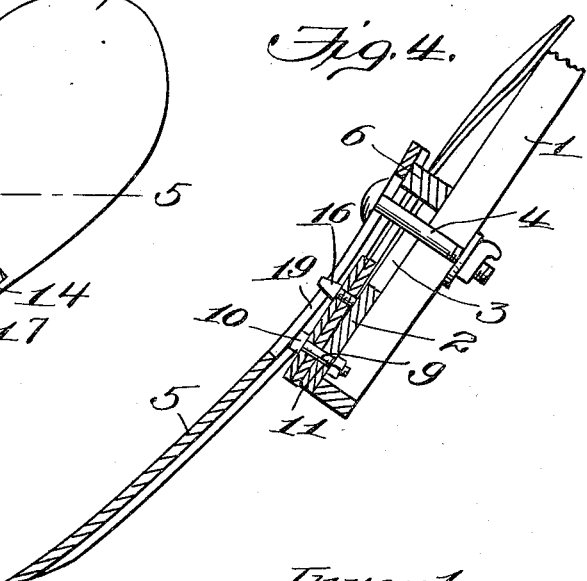

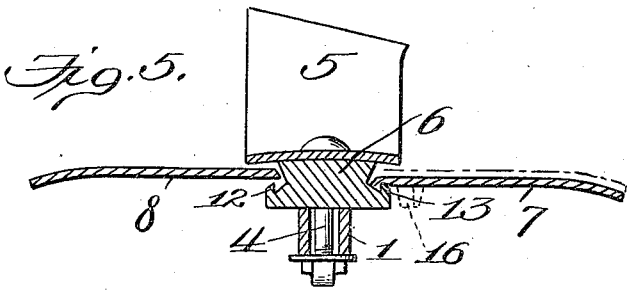
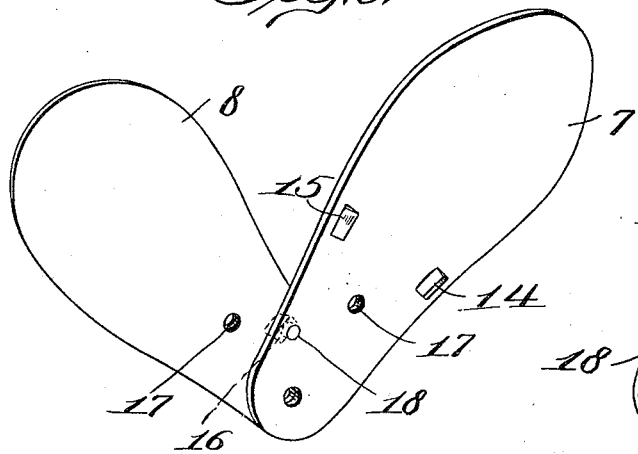
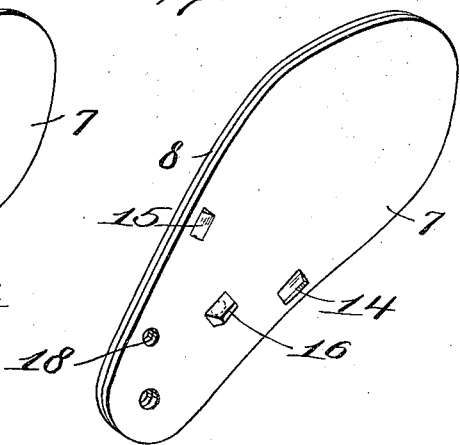
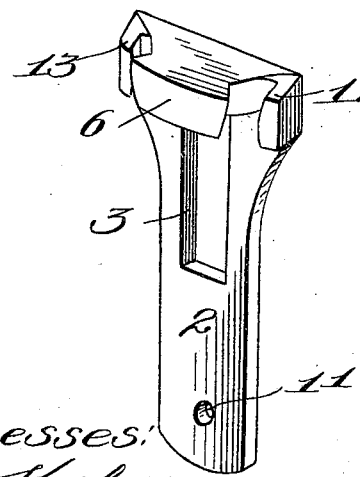

PERCY NEUFVILLE, OF VININGS, GEORGIA.

PLOW ATTACHMENT.

944,206.  Specification of Letters Patent.  Patented Dec. 21, 1909.

Application filed February 15, 1909. Serial No. 477,985.

*To all whom it may concern:*

Be it known that I, PERCY NEUFVILLE, a citizen of the United States, residing at Vinings, in the county of Cobb and State of Georgia, have invented new and useful Improvements in Plow Attachments, of which the following is a specification.

My present invention relates to improvements in plow attachments, and it has for its object primarily to provide a pair of wings in combination with means for reversibly mounting them on a plow stock whereby the soil on a hill-side or terrace may be cultivated efficiently and with facility.

Another object of the invention is to provide simple and improved means for locking or securing the wings either both at the same side of the plow stock or so that one wing shall project at an appropriate angle from each side thereof, the plow in the latter instance being adapted for various uses such, for instance, as in opening or laying off rows or in the listing of cotton, potatoes, and other crops where a raised bed is desirable or necessary.

A further object of the invention is to provide a foot-piece for attaching the wings to the plow stock, such foot-piece being provided with catches that are coöperative with the wings for securing them in the different adjusted positions, the pressure of the soil against the wings acting to retain them firmly in locked position.

To these and other ends, the invention consists in certain improvements, and combinations and arrangements of parts, all as will be hereinafter more fully described, the novel features being pointed out particularly in the claims at the end of the specification.

In the accompanying drawing:—Figure 1 represents a front elevation of the lower end of a plow stock provided with an attachment constructed in accordance with my present invention, the wings being shown in opened relation; Fig. 2 is a view similar to Fig. 1 both wings extending at the same angle from one side of the plow stock; Fig. 3 represents a rear elevation of Fig. 1; Fig. 4 represents a central vertical section on the line 4—4 of Fig. 1; Fig. 5 represents a transverse section on the line 5—5 of Fig. 3, the full lines showing the wings as extending from opposite sides of the standard while the dotted lines indicate the relative positions of the wings when both are arranged to extend from the same side of the standard; Fig. 6 is a perspective view of the two wings removed from the plow standard, the wings being locked together in opened relation; Fig. 7 is a perspective view of the two wings showing them in closed relation or one behind the other and secured in such position; Fig. 8 is a perspective view of the foot-piece for supporting and locking the wings in the different adjusted positions; and Figs. 9 and 10 are perspective views of the pivot bolt for the wings and the locking bolt, respectively.

Similar parts are designated by the same reference characters in the several views.

In the accompanying drawing, I have shown one specific embodiment of the invention as adapted for use upon that class of plows embodying a standard 1 which may be of a loop form as shown. To the forward side of this standard is applied a foot-piece 2 which is preferably flat at its rear side so as to fit properly against the plow stock, and this foot-piece is provided with a vertically-extending slot 3 through which extends a securing bolt 4, the latter extending also through the slot formed between the looped sections of the standard 1 and this bolt also serves to secure the scooter plate 5 in position. The upper end of this scooter plate is preferably convex as shown in Fig. 5 and it has a firm seating against the convex head 6 formed on the top of the foot-piece 2.

A pair of wings 7 and 8 are provided which may be of an appropriate form, those shown in the present instance being lobe-shaped and of preferably the same size. The lower or smaller ends of these wings are apertured to receive a pivot bolt 9 the head 10 of which bears on the forward side of the upper wing and extends through an aperture 11 in the lower end of the foot-piece which extends beyond the bottom of the plow stock, a nut serving to fasten the bolt in position. This bolt 9 permits a pivotal movement of the wings relatively to each other as well as with respect to the foot-piece whereby the two wings may be set either as shown in Figs. 1 and 3 wherein they extend divergently from the opposite sides of the plow stock, or they may be arranged one behind the other and both may extend from either the right or the left hand side of the stock as necessity may require. The head 6 of the foot-piece lies substantially in the plane of the wings and is interposed between them when the wings are arranged as shown in Figs. 1 and 3, the opposite sides of the head 6 being undercut and provided with catch projections 12 and 13 which, in order to serve as latches, are beveled toward their outer edges. One of the wings (the wing 7 in the present instance) is provided with a pair of locking recesses 14 and 15 which are arranged concentrically with the bolt 9 as an axis and are arranged to coöperate with the respective catch projections on the foot-piece. This wing 7 bears directly against the forward side of the foot-piece and when the wings are so set as to extend respectively from the opposite sides of the plow stock, the locking recess 15 is engaged by the locking projection 13 on the foot-piece. The locking recess 15 will also coöperate with the catch projection 13 when the wing 8, as well as the wing 7, extends from the right hand side of the plow stock. However, when the wing 7 is reversed in position, that is to say, it is turned about the bolt 9 as an axis until it extends from the left hand side of the plow stock, the locking recess 14 thereon will be engaged by the locking projection 12 of the foot-piece.

From the above description, it will be observed that the foot-piece has a direct locking relation with the wing 7 which is immediately adjacent thereto and, according to the present invention, I provide means for locking the wing 8 to the wing 7, a locking device preferably in the form of a screw 16 being provided which is adapted to be inserted in a pair of threaded openings 17 in the two wings which openings register when the wings are arranged one behind the other and both extend from the same side of the plow standard as shown in Fig. 7, and when the wings are in opened relation as shown in Figs. 1, 3 and 6, this locking bolt is adapted to coöperate with a pair of registering apertures 18 which are also threaded and, when the wings are set in the relation shown in Figs. 1, 3 and 6, these apertures 18 will be in alinement with a slot 19 which is formed in the plate 5 so that this locking bolt may then be passed through such slot from the forward side of the plow. When both wings are arranged one behind the other and extend from the same side of the plow stock, the locking bolt 16 enters the wings in the rear side as indicated in Figs. 2 and 5.

When the two wings are in opened relation, that is to say, they extend respectively from the opposite sides of the plow stock, the head 6 of the foot-piece which is interposed between them prevents a closing movement thereof due to pressure of the soil on their outer edges, and any tendency of the wings to open will be prevented by the locking projections which coöperate with the wing 7. Moreover, as the locking recesses are formed in the rear side of this plate, obviously the pressure of the soil thereon will act to positively retain the locking projections in engagement with the respective recesses so that an unlocking of the wings cannot occur. The wing 8 being locked to the wing 7 will also be positively retained in proper position.

I claim as my invention:—

1. A plow attachment comprising a pair of wings capable of lying one immediately behind the other and also capable of occupying a relative angular relation, said wings having apertures arranged to register when said wings occupy each of said positions, a pivot adjustably connecting the wings, and a locking device capable of insertion interchangeably in said apertures when brought into registration.

2. A plow attachment comprising a pair of wings capable of lying one immediately behind the other and also capable of occupying an angular relation, a pivot adjustably connecting said wings, and a device independent of said pivot and capable of locking the wings in either of the said two positions.

3. A plow attachment comprising a pair of wings, means for adjustably supporting them on a plow stock, and interlocking means connecting the wings for securing them in a given angular relation and also one behind the other.

4. A plow attachment comprising a foot-piece adapted for attachment to a plow stock, a pair of wings capable of lying one immediately behind the other and also capable of occupying an angular relation, a pivot movably connecting the wings to the foot-piece and permitting the wings to be adjusted into either of the two said positions, and means independent of said pivot for directly connecting the wings and thereby locking them positively in either of said two positions.

5. A plow attachment comprising a wing, means for supporting the same on a plow stock, and catches for holding the wing in predetermined angular relation to the plow stock, said catches being capable of being retained in locked position by the pressure of the soil against the wing.

6. A plow attachment comprising a foot-piece adapted for attachment to a plow stock, a wing having a pivot for adjustably mounting it with respect to said foot-piece, and a catch for locking the wing in adjusted relation to the foot-piece.

7. A plow attachment comprising a foot-piece adapted for attachment to a plow standard, a pair of wings mounted in pivotal relation to each other and to the foot-piece, and a pair of catches for locking one of the wings at either side of said foot-piece.

8. A plow attachment comprising a foot-piece adapted for attachment to a plow stock, a pair of wings provided with a pivot for adjustably mounting them with respect to each other and to the foot-piece, means for locking the wings either in angular relation or when arranged one behind the other, and catches carried by the foot-piece and coöperative with one of the wings for locking the same at either side of the foot-piece.

9. A plow attachment comprising a foot-piece adapted for attachment to a plow stock, a pair of wings mounted pivotally with respect to each other and to the foot-piece, and a locking device adapted to interlock the wings when the latter are either in angular relation or arranged one behind the other.

10. In a plow attachment, the combination of a plow stock, a foot-piece fitted thereon, a pair of wings adjustably mounted on a common pivot carried by the foot-piece, and a bolt securing the foot-piece to the plow stock independently of the wings.

11. A plow attachment comprising a foot-piece adapted for attachment to a plow stock and provided with a head portion having beveled catch projections at opposite sides, a pair of wings pivotally mounted on the foot-piece, one of the wings having a pair of locking recesses formed in its rear face and coöperative respectively with the catch projections on the foot-piece, and means for connecting the wings to secure them either in angular relation or one behind the other.

In testimony whereof I have hereunto set my hand in presence of two subscribing witnesses.

PERCY NEUFVILLE.

Witnesses:
F. L. NEUFVILLE,
B. W. TYE.